March 29, 1938. J. ABRAHAMS 2,112,661
TIRE LOCK
Filed March 31, 1936

INVENTOR.
Jacob Abrahams
BY
ATTORNEY.

Patented Mar. 29, 1938

2,112,661

UNITED STATES PATENT OFFICE 2,112,661

TIRE LOCK

Jacob Abrahams, Bradley Beach, N. J.

Application March 31, 1936, Serial No. 71,845

2 Claims. (Cl. 157—6)

This invention is a tire lock adapted to facilitate the mounting of a vehicle tire upon a so-called "drop center rim". Rims of the character described are made solid, in contradistinction to the well known split rim, and are provided with drop centers of lesser diameter than the remainder of the rim, so as to make it possible to place a tire on and remove the same from the rim without stretching the bead of the shoe. The drop center of the rim permits a portion of the tire already placed upon the rim to drop therein and thus permit successive portions of the tire to be passed over the circumferential rim flange until the entire shoe is in place on the rim.

Experience has shown, however, that while it is a relatively simple matter to introduce a portion of the tire on to the rim, it is extremely difficult to keep that portion in place while successive portions are worked over the edge of the rim, for, as the workman proceeds along the rim to place successive portions of the shoe bead therein, that portion, which he has previously introduced, slips out, so that one portion of the tire already in place comes off of the rim as fast as he can put in the new portion.

The experienced tire man attempts to hold the mounted portion of the tire in place with a tire iron held in one hand, while he manipulates the successive portions into position. Even an experienced hand, however, finds difficulty in accomplishing this, and the result is that the majority of tires are placed on drop center rims through the use of heavy hammers and the like which seriously injure the tire through the improper application of the same.

The object of the present invention is to eliminate this difficulty through the provision of a simple and efficient tool which materially assists in holding a portion of the shoe in position, while successive portions of the shoe are placed on the rim. I have found that the secret of accomplishing this result satisfactorily is to provide a tire lock which will hold its position at some predetermined point in the circumference of the rim and which is so shaped that that portion of the tire which comes in contact with the lock will be forced into radial alinement with the drop center of the rim, so as to guide the bead of that portion of the tire into the drop center as successive portions of the tire are placed on the rim and to so hold the tire during this operation, that, when the lock is in place, that portion of the tire which has been introduced on to the rim will not become inadvertently displaced.

The tool of the present invention accomplishes these results without damage to the tire and greatly facilitates the mounting of a tire on a rim of the character described.

In its preferred practical form, the tool of this invention comprises a hook shaped head adapted to hook over one flange of a rim and surmounting a handle of sufficient length to bear against the hub or spokes of the associated wheel, and said head is provided with a projecting finger shaped to substantially conform to the side wall of a tire shoe and is sufficiently high to prevent the bead of the shoe from slipping over the hook shaped head. The free end of the head is of sufficient width to substantially bridge the space between the flange and the drop center of the rim, so as to guide the bead into said drop center when tension is placed on the bead incident to the introduction into the rim of successive portions of the tire.

The tool of the present invention is economical to manufacture and thoroughly efficient in its operation.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figures 1, 2:
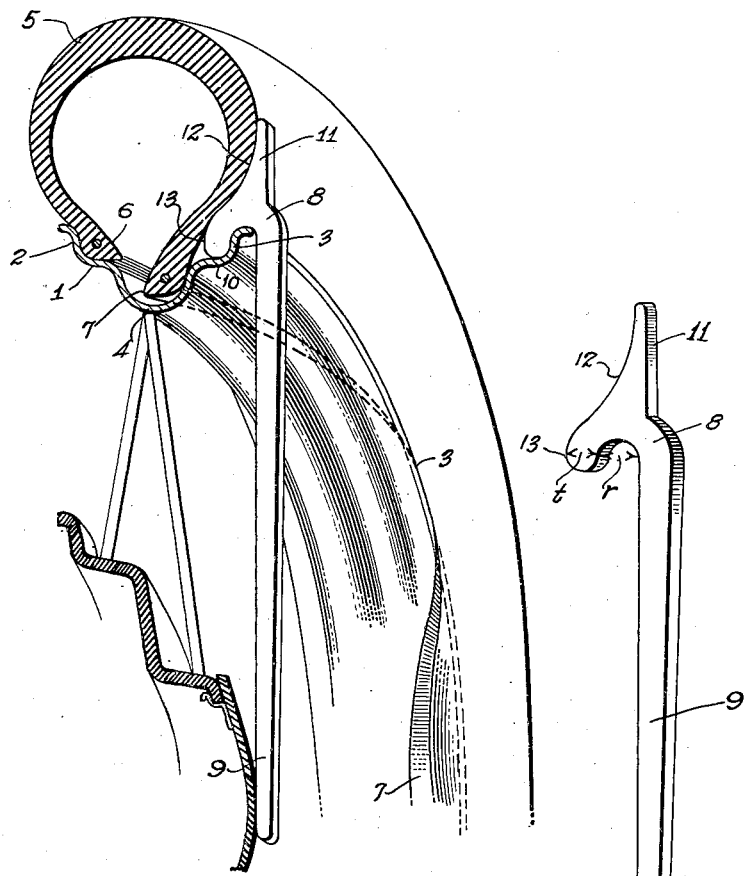
Figure 1 is a fragmental perspective section showing a portion of a wheel having a drop center tire rim with a tire partially mounted thereon and illustrating the manner in which the tire lock of the present invention cooperates with the rim and tire to facilitate this operation.
Figure 2 is a perspective view of the tire lock detached from the rim.

In the accompanying drawing, 1 designates a conventional drop center rim having side flanges 2 and 3 and a drop center channel 4. A tire shoe, indicated at 5, is conventional in form, and is provided with the usual beads 6 and 7. The inner tube is not shown.

The tire lock of the present invention embodies a hook shaped head 8 formed on one end of a handle 9. Said head is substantially semicircular in form and is adapted to be hooked over the flange 3, as shown, while the handle 9 is adapted to rest against the spokes or hub of the wheel with which the rim is associated. The inner diameter $r$ of the hook shaped head 8 is such as to permit it to be readily hooked over the flange 3, while the thickness $t$ of the free end of the head is approximately equal to the substantially flat portion 10 of the rim which lies between the flange 3 and the drop center channel 4.

Projecting upwardly from the head 8 and formed integral therewith is a projecting finger 11 adapted to reach in an outward radial direction beyond the head 8 and having its inner edge shaped on a curve 12 which substantially conforms to the shape of the side wall of the shoe 5. This edge 12 merges into the corresponding edge 13 of the head to form therewith an o-gee curve which conforms to the shoe section.

In practice, a portion of the circumference of the bead 7 of the shoe is sprung over the flange 3 and thereafter the lock of the present invention is hooked over said flange, as shown in Figure 1. This having been done, the operator proceeds to work along the tire in, for example, a clockwise direction, using the usual tire iron to lift that portion of the bead 7, which remains without the rim, over the edge of the rim and into the interior thereof. As he does this, the bead 7 is placed under tension and, because of the configuration of the edges 12 and 13, these edges guide that portion of the bead which is next to the tire lock in such manner as to press it inwardly free from contact with the flat surface 10 and into radial alinement with the drop channel 4, so that as successive portions of the tire are placed on the rim, the bead 7 radially is guided into the drop channel without undue wear or strain thereon, thereby permitting the tire to be readily placed on the rim throughout its entire circumference.

In the tool of the present invention, the projecting finger 11 is important for it precludes the bead from mounting and slipping over the hook shaped head when tension is applied to the bead, and it cooperates with the edge 13 of the head to guide the side wall of the shoe into a position wherein the bead will drop easily into the channel 4.

When the tool of the present invention is employed, there is no hammering or pounding necessary on the tire and it may be conveniently, easily and expeditiously installed on the rim. After the whole tire has been positioned on the rim, the locking member of this invention is removed and the tire immediately springs into proper position with the bead 7 resting on the flat portions of the rim.

The foregoing detailed description sets forth the present invention in its preferred practical form, but the invention is to be understood as fully commensurate with the appended claims.

Having thus fully described the invention, what I claim as new and desire to secure by Letters Patent is:

1. A tire tool for mounting a tire on a drop center rim comprising a handle provided at one end with a hook shaped head adapted to be hooked over and rest against the inner side of one flange of the drop center rim and projecting inwardly across the flat portion or ledge of the rim, said head having a curved edge contiguous to and forming a continuation of the adjacent side wall of the drop center channel of the rim to guide a tire bead into the bottom of the channel and a projecting finger surmounting said head to bear against the side wall of the tire for the greater portion of the height of the latter, the tire contacting edge of said finger substantially conforming to the contacting side wall of the tire and merging into the free end portion of the hook shaped head, the free end portion of the handle being adapted to engage the wheel hub and hold the tool in place.

2. A tire tool for mounting a tire on a drop center rim comprising a handle, a hook on the handle adapted to be hooked over one flange of the rim with the handle contacting a part of the wheel, said hook having an end adapted to bear against the inside wall of the flange and extending across the flat portion of the rim with the outer face of the hook forming a continuation of the contiguous side wall of the drop center channel to guide the bead of the tire into said channel; and a finger surmounting the hook having an outer surface substantially conforming to the contour of the side of the tire and forming a continuation of the bead guiding surface of the hook.

JACOB ABRAHAMS.